US008036821B2

(12) United States Patent  (10) Patent No.: US 8,036,821 B2
Cornett et al.  (45) Date of Patent: Oct. 11, 2011

(54) METHODS AND SYSTEMS FOR DIMINISHING THE EFFECTS OF AN ACOUSTIC SIGNATURE OF VEHICLES

(75) Inventors: Alan G. Cornett, Andover, MN (US); David W. Meyers, Brooklyn Park, MN (US); Robert E. DeMers, Elk River, MN (US)

(73) Assignee: Honeywell International Inc., Morristown, NJ (US)

( * ) Notice: Subject to any disclaimer, the term of this patent is extended or adjusted under 35 U.S.C. 154(b) by 965 days.

(21) Appl. No.: 11/958,775

(22) Filed: Dec. 18, 2007

(65) Prior Publication Data

US 2009/0157293 A1  Jun. 18, 2009

(51) Int. Cl.
G01C 21/00  (2006.01)
(52) U.S. Cl. ........................................ 701/200; 701/202
(58) Field of Classification Search .................. 701/200, 701/202
See application file for complete search history.

(56) References Cited

U.S. PATENT DOCUMENTS

| | | | |
|---|---|---|---|
| 1,299,616 A | 4/1919 | Rieber | |
| 1,578,325 A | 3/1926 | Kunze | |
| 1,757,874 A | 5/1930 | Petschenig | |
| 3,531,764 A | 9/1970 | Hill | |
| 4,210,969 A | 7/1980 | Massa | |
| 4,408,533 A | 10/1983 | Owen et al. | |
| 4,479,113 A | 10/1984 | McNeilly et al. | |
| 4,719,606 A | 1/1988 | Andrieu | |
| 5,007,032 A | 4/1991 | Jensen | |
| 6,199,008 B1 | 3/2001 | Aratow et al. | |
| 6,266,610 B1 | 7/2001 | Schultz et al. | |
| 6,317,690 B1 | 11/2001 | Gia | |
| 6,859,418 B2 | 2/2005 | Miller | |
| 7,034,716 B2 * | 4/2006 | Succi et al. | 340/935 |
| 7,769,502 B2 * | 8/2010 | Herman | 701/6 |
| 2005/0068199 A1 * | 3/2005 | Succi et al. | 340/933 |
| 2006/0271245 A1 * | 11/2006 | Herman | 701/1 |
| 2010/0017114 A1 * | 1/2010 | Tehan et al. | 701/202 |
| 2010/0080086 A1 * | 4/2010 | Wright et al. | 367/191 |

* cited by examiner

*Primary Examiner* — Mark Hellner
(74) *Attorney, Agent, or Firm* — Ingrassia Fisher & Lorenz, P.C.

(57) ABSTRACT

Methods and systems are provided for diminishing the effects of an acoustic signature of a vehicle while the vehicle is en route to a destination. One method includes the steps of retrieving acoustic data representing an acoustic model of the vehicle, terrain data representing a terrain model of a geographic area surrounding the destination, route data representing a model of a plurality of routes to the destination, and weather data representing atmospheric conditions of the geographic area. The method also includes selecting a route to the destination based on the acoustic, terrain, route, and weather data. A system includes means for performing the retrieving step and the selecting step of the above method. Another system includes memory storing the acoustic, terrain, route, and weather data, and a processor coupled to the memory and configured to select a route to the destination based on the acoustic, terrain, route, and weather data.

19 Claims, 2 Drawing Sheets

METHODS AND SYSTEMS FOR DIMINISHING THE EFFECTS OF AN ACOUSTIC SIGNATURE OF VEHICLES

TECHNICAL FIELD

The present invention generally relates to vehicles, and more particularly relates to methods and systems for diminishing the effects of an acoustic signature of vehicles.

BACKGROUND

When engaging an adversary in a hostile situation, the element of surprise can often be the difference between victory and defeat. As such, the ability to approach the adversary without being detected for as long as possible is highly desirable. Often, however, when a vehicle having an engine and/or other noise-generating components is used to engage the adversary, the amount of time the vehicle is able to go undetected may be reduced because the adversary is, at times, able to hear the vehicle before he/she is able to see the vehicle.

Accordingly, it is desirable to provide methods and systems for diminishing the effects of an acoustic signature of a vehicle while the vehicle is en route to a destination. Furthermore, other desirable features and characteristics of the present invention will become apparent from the subsequent detailed description of the invention and the appended claims, taken in conjunction with the accompanying drawings and this background of the invention.

BRIEF SUMMARY

Methods are provided for diminishing the effect of an acoustic signature of a vehicle while the vehicle is en route to a destination. One exemplary method comprises the step of retrieving acoustic data representing an acoustic model of the vehicle, terrain data representing terrain of a geographic area surrounding the destination, route data representing a plurality of routes to the destination, and weather data representing atmospheric conditions of the geographic area. The method also comprises the step of selecting a route to the destination based on the acoustic data, the terrain data, the route data, and the weather data.

Systems for diminishing the effects an acoustic signature of a vehicle while the vehicle is en route to a destination are also provided. An exemplary system comprises means for retrieving acoustic data representing an acoustic model of the vehicle, terrain data representing terrain of a geographic area surrounding the destination, route data representing a plurality of routes to the destination, and weather data representing atmospheric conditions of the geographic area. This system also comprises means for selecting a route to the destination based on the acoustic data, the terrain data, the route data, and the weather data.

Another exemplary system comprises memory storing acoustic data representing an acoustic model of the vehicle, terrain data representing a terrain model of a geographic area surrounding the destination, route data representing a model of a plurality of routes to the destination, and weather data representing atmospheric conditions of the geographic area. The system also comprises a processor coupled to the memory and configured to select a route to the destination based on the acoustic data, the terrain data, the route data, and the weather data.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
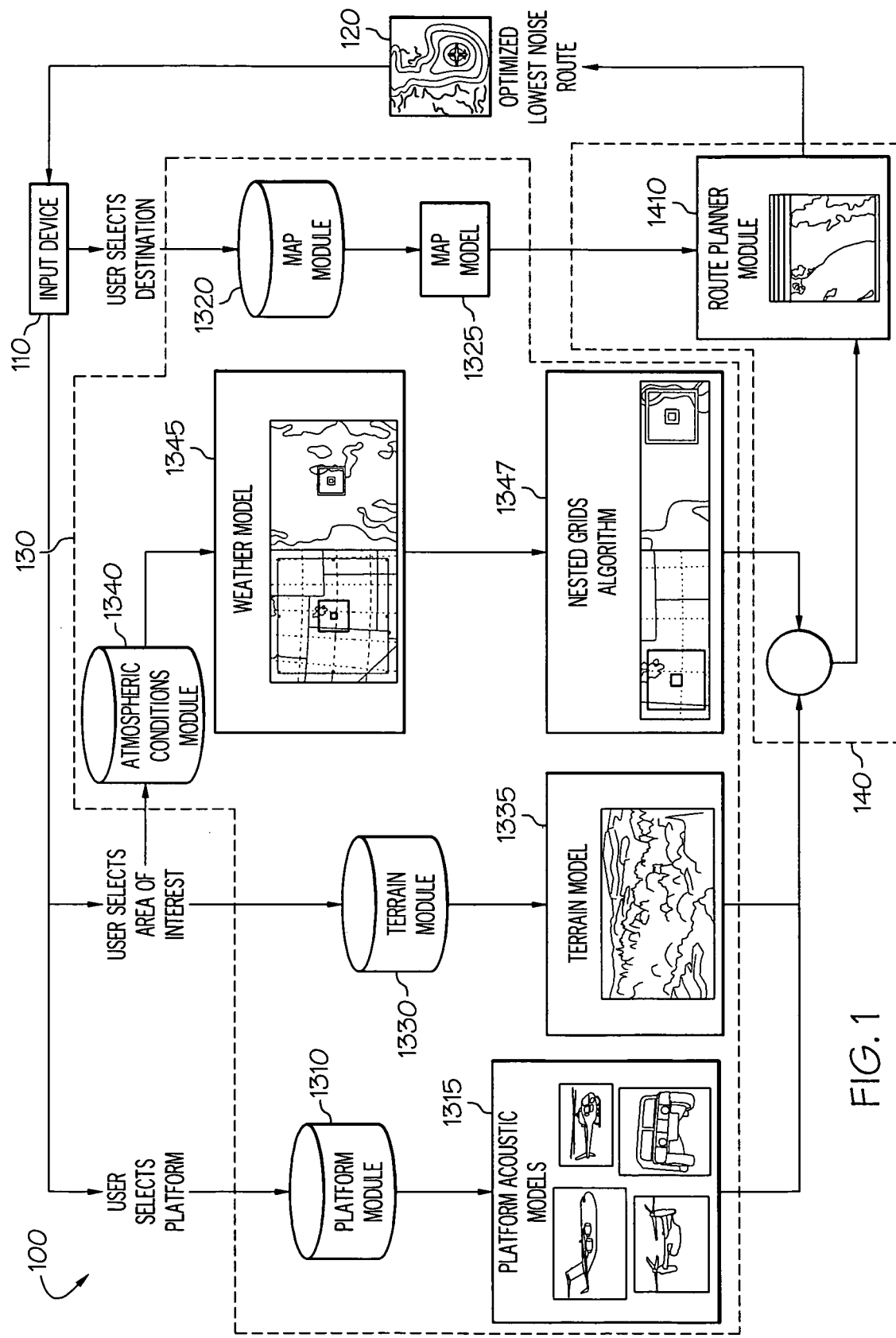
FIG. 1 is a block diagram of one exemplary embodiment of a system for diminishing the effects of an acoustic signature of a vehicle while the vehicle is en route to a destination.

FIG. 1 is a block diagram of one exemplary embodiment of a system 100 for diminishing the effects of a acoustic signature of a vehicle (e.g., aircraft, motor vehicles, ships, submarines, trains, and the like platforms including one or more noise-generating components) while the vehicle is en route to a destination. System 100 comprises an input device 110, a display 120, and memory 130 coupled to a processor 140.

Input device 110 may be any hardware and/or device capable of receiving user input including, for example, a keyboard, a mouse, a touchpad, a microphone, and the like input devices. Display 120 may be any hardware, device, logic, and/or firmware capable of presenting data to a user.

Memory 130 may be any hardware, device, logic, and/or firmware capable of storing computer data, computer code, computer-executable instructions, computer programs, and/or the like for retrieval and use by a processor (e.g. processor 140). As illustrated in FIG. 1, memory 130, at least in the depicted embodiment, comprises a platform module 1310, a map module 1320, a terrain module 1330, and an atmospheric conditions module 1340. Below, each of the modules will be discussed in greater detail.

Platform module 1310 comprises data 1315 representing the acoustic signature of one or more vehicles. That is, the data stored in platform module 1310 is a profile of the noise generated by or the noise emissions of the vehicle(s) during operation. In aircraft, for example, noise is typically emitted or generated by the engine(s), the propeller(s), the movement of air over the airframe, drag, and the like. Likewise, the engine, the wheels making contact with a surface, the operation of the suspension, the movement of air over the chassis, and the like emit noise in motor vehicles. In marine vessels, noise is generated by engines, propeller shafts, fuel pumps, air conditioning systems, the creation of gas bubbles caused by the turning of the propellers, the movement of water displaced by the hull of a moving vessel, and the like.

Map module 1320 comprises data 1325 representing a model of one or more geographic areas. The model may represent the entire world, one or more continents, one or more countries, one or more states/provinces, one or more regions, one or more cities, and/or a subset of such. In one embodiment, data 1325 includes a plurality of routes or paths to and from one or more locations within the geographic area(s). Each route may be an actual road, flight path, or shipping lane, or may be a representation of a possible way of approaching or leaving a location.

Terrain module 1330 comprises data 1335 representing a three-dimensional topographical model of the geographic area(s) stored in map module 1320. Data 1335 represents, for example, geological formations (e.g., mountains, hills, canyons, valleys, plateaus, plains, etc.) and bodies of water, as well the physical characteristics of the geological formations (e.g., wooded, rocky, desert, coastal, grassland, jungle, swamp, etc.). Each geological formation and body of water may be assigned a value or indicator based in its ability to amplify, dampen, block, and/or propagate sound (or noise) emitted from a vehicle. Likewise, value may be added to or subtracted from a geological formation based the ability of the physical characteristics to amplify, dampen, block, and/or propagate sound from a vehicle. For example, a hill may have a lower value than a canyon because the hill is more likely to dampen and/or block noise emitted from a vehicle, whereas a canyon is more likely to amplify and/or propagate noise emitted from the vehicle. Similarly, a wooded hill may have a lower value compared to a rocky hill because trees are more likely to dampen and/or block noise emitted from a vehicle, whereas rock formations are more likely to amplify and/or propagate noise emitted from the vehicle.

Atmospheric conditions module 1340 comprises data 1345 representing a model of the current weather conditions of the geographic area(s) stored in map module 1320. The data may represent the wind velocity and direction, air temperature, air density, air pressure, turbulence, humidity, precipitation, water temperature, water current velocity and direction, depth of water, and/or any other condition that may amplify, dampen, block, and/or propagate sound emitted from a vehicle. Similar to terrain module 1330, each atmospheric condition is assigned a value or indicator based in its ability to amplify, dampen, block, and/or propagate sound emitted from a vehicle. In one embodiment, atmospheric conditions module 1340 is a Weather Research and Forecasting (WRF) module that may be scaled into nested grids by a nested grids algorithm 1347 for one or more of the geographic areas stored in map module 1320. In another embodiment, atmospheric conditions module 1340 is in communication with an external data source (not shown) and is configured to retrieve the current weather conditions of a geographic area from the external source and assign the appropriate value to each weather condition.

Processor 140 may be any hardware, device, logic, and/or firmware capable of executing computer code, computer instructions, computer modules, and/or computer programs. In one embodiment, processor 140 is configured to receive user input via input device 110, which may include, for example, a vehicle selection, a starting location, and a desired destination.

Processor 140 is configured to, in response to user input received from input device 110, determine a route from the starting location to the destination having the smallest acoustic signature for the selected vehicle. In other words, processor 140 determines a route in which the selected vehicle could travel the closest to the destination with the least chance of being detected acoustically by a person or a device present at the destination. To accomplish such, processor 140 comprises a route planner module 1410 configured to retrieve the acoustic model of the selected vehicle from platform module 1310, the model of the geographic area surrounding the destination from map module 1320, the terrain model of the geographic area surrounding the destination from terrain module 1330, and the current weather conditions model from atmospheric conditions module 1340. Route planner module 1410 is also configured to determine a plurality of possible routes from the starting point to the destination. In addition, route planner module 1410 is configured merge the terrain data and the current weather conditions data into each of the possible routes and estimate the acoustic signature of the selected vehicle for each of the possible routes based on the acoustic profile of the selected vehicle and the values associated with the geological formations, the terrain characteristics, and the atmospheric conditions.

In one embodiment, route planner module 1410 is configured to select the route including the smallest estimated acoustic signature for the selected vehicle as the optimal or preferred route, and present such route to the user (via display 120). In another embodiment, route planner module 1410 is configured to select two or more routes having relatively small estimated acoustic signatures for the selected vehicle and present such routes along with the respective values for each route to the user (via display 120).

Figure 2:
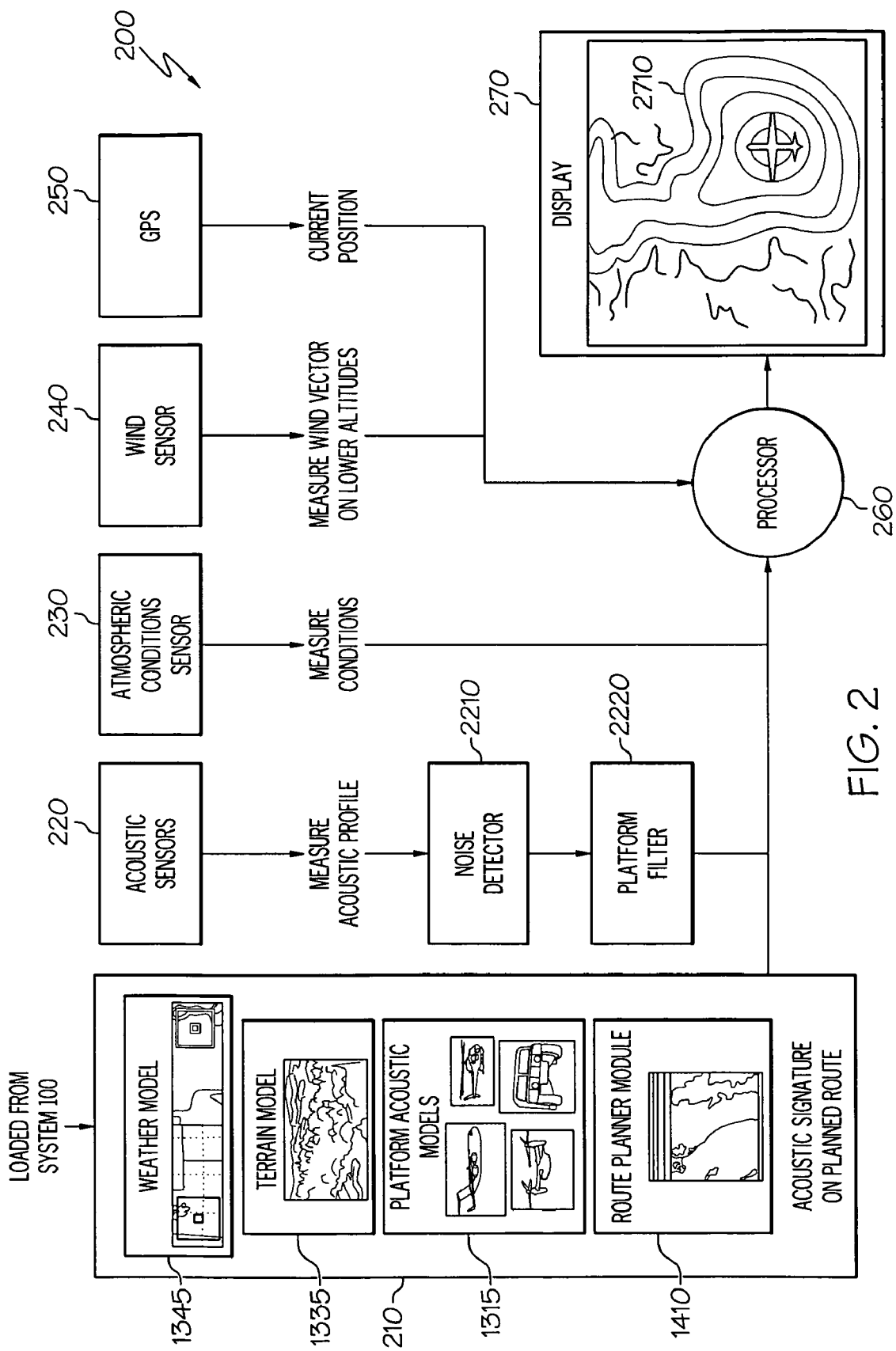
FIG. 2 is a block diagram of another exemplary embodiment of a system for diminishing the effects of an acoustic signature of a vehicle in real-time while the vehicle is en route to the destination.

FIG. 2 is a block diagram of another exemplary embodiment of a system 200 for diminishing the effects of an acoustic signature of a vehicle (e.g., aircraft, motor vehicles, ships, submarines, trains, and the like platforms including one or more noise-generating components) in real-time while the vehicle is en route to the destination. System 200 comprises memory 210, one or more acoustic sensors 220, one or more atmospheric conditions sensors 230, one or more wind sensors 240, and a global positioning system (GPS) 250, each being coupled to a processor 260. System 200 also comprises a display 270 coupled to processor 260.

Memory 210 may be any hardware, device, logic, and/or firmware capable of storing computer data, computer code, computer-executable instructions, computer programs, and/or the like for retrieval and/or use by processor 260. In one embodiment, memory 210 is configured to receive and store at least a portion of the data stored and/or generated by system 100 (see FIG. 1). That is, memory 210 may receive and store the acoustic model of the selected vehicle from previously-described platform module 1310, the model of the geographic area surrounding the destination from previously-described map module 1320, the terrain model of the geographic area surrounding the destination from previously-described terrain module 1330, and the current weather conditions model from previously-described atmospheric conditions module 1340. Furthermore, memory 210 may also receive and store the data representing the possible routes from the starting point to the destination along with the merged terrain data and the current weather conditions data from previously-described route planner module 1410. In addition, memory 210 may receive and store the estimate of the acoustic signature of the selected vehicle for each of the possible routes based on the acoustic profile of the selected vehicle and the values associated with the geological formations, the terrain characteristics, and the atmospheric conditions as generated by route planner module 1410.

Each acoustic sensor 220 may be any hardware and/or device capable of detecting the acoustic profile of the environment surrounding the vehicle while the vehicle is en route to the destination. In one embodiment, acoustic sensor 220 comprises a noise detector 2210 and a platform noise filter 2220. Noise detector 2210 may be any hardware and/or device capable of detecting sound or noise in the environment surrounding the vehicle. Platform noise filter 2220 may be any hardware and/or device capable of filtering out the noise emitted by the vehicle while the vehicle is operating in the environment so that the amount of background noise in the environment surrounding the vehicle can be determined.

Atmospheric conditions sensor(s) 230 may be any hardware and/or device capable of detecting the actual weather conditions surrounding the vehicle while the vehicle is en route to the destination. For example, atmospheric conditions sensor 230 may detect air temperature, air density, air pressure, turbulence, humidity, precipitation, water temperature, water current velocity and direction, depth of water, and/or any other condition that may amplify, dampen, block, and/or propagate sound emitted from the vehicle.

Each wind sensor 240 may be any hardware and/or device capable of detecting the wind velocity and direction at one or more altitudes while the vehicle is en route to the destination. In one embodiment, wind sensor 240 comprises a Light Detection and Ranging (LIDAR) system for measuring the wind velocity and direction. In another embodiment, wind sensor 240 comprises a Laser Detection and Ranging (LADAR) system for measuring the wind velocity and direction.

GPS 250 may be any hardware and/or device capable of detecting the present position and tracking the position of the vehicle while the vehicle is en route to the destination. Global positioning systems are well-known in the art, and therefore, the details of GPS 250 need not be described herein.

Processor 260 may be any hardware, device, logic, and/or firmware capable of executing computer code, computer instructions, computer modules, and/or computer programs. In one embodiment, processor 260 is configured to receive the data stored in memory 210, the data detected by acoustic sensor 220, the data detected by atmospheric conditions sensor 230, and/or the data detected by wind sensor 240, and update portions of the data stored in memory 210 with the appropriate actual conditions detected by acoustic sensor 220, atmospheric conditions sensor 230, and/or wind sensor 240 while the vehicle is en route to the destination. Specifically, the acoustic model and the weather conditions stored in memory 210 may be updated by the actual acoustic signature of the vehicle and the actual weather conditions, respectively.

Processor 260 is also configured to determine the actual acoustic signature of the selected vehicle for the originally-selected route and each of the plurality of possible routes, and compare the actual acoustic signature of the vehicle for each of the routes. Processor 260 is also configured to then select another one of the plurality of routes as an alternative route if the actual acoustic signature of the other route is smaller than the actual acoustic signature of the initially-selected route. That is, processor 260 is configured to select another route to the destination while the vehicle is en route to the destination if the other route provides a better opportunity to approach the destination in an acoustically less-detectable manner than the originally-selected route.

Processor 260 is also configured to receive data from acoustic sensor 220, atmospheric conditions sensor 230, wind sensor 240, and/or GPS 250 and generate a real-time acoustic profile of the vehicle in relation to the surrounding area while the vehicle is en route to the destination and transmit the real-time acoustic profile to display 270 for presentation to a user. In one embodiment, the real-time acoustic profile may be represented as a "bubble" 2710 surrounding the vehicle as the vehicle travels along its route. In this embodiment, the different levels of noise emitted by the vehicle in relation to the area surrounding the vehicle may be represented by different colors or other manner capable of distinguishing the various noise levels. For example, the area surrounding the vehicle propagating the smallest amount of noise may be a lighter shade of a single color that grows increasing darker as the amount of noise increases or different areas of bubble 2710 may be different colors representing the different noise levels of the vehicle. Accordingly, the operator of the vehicle can then vary the route to the destination in real-time based on which areas surrounding the vehicle exhibit a small acoustic signature for the vehicle.

Display 270 illustrates an example of how an aircraft pilot is able to choose a route exhibiting a relatively small acoustic signature while flying to a selected destination. While the aircraft is following a route (either the original route selected by processor 140 or another route selected by processor 260) to the destination, the pilot is able to make detailed adjustments in real-time based on the actual conditions detected by acoustic sensor 220, atmospheric conditions sensor 230, and/or wind sensor 240. In this example, the lighter color shades of bubble 2710 indicate that the acoustic signature of the aircraft is the smallest in the area between the mountains. Accordingly, the pilot should choose to fly between the mountains because this is where the noise emitted from the aircraft is propagated the least amount in comparison to the other areas surrounding the aircraft.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The invention claimed is:

1. A method for diminishing an effect of an acoustic signature of a vehicle while the vehicle is en route to a destination, the method comprising the steps of:
    retrieving acoustic data representing an acoustic model of the vehicle, terrain data representing terrain of a geographic area surrounding the destination, route data representing a plurality of routes to the destination, and weather data representing atmospheric conditions of the geographic area; and
    selecting a route to the destination based on the acoustic data, the terrain data, the route data, and the weather data.

2. The method of claim 1, further comprising the steps of:
    estimating the acoustic signature of the vehicle for each of the plurality of routes; and
    selecting a route including a smallest estimated acoustic signature as the selected route.

3. The method of claim 1, further comprising the steps of:
    detecting actual atmospheric conditions of the geographic area while the vehicle is en route to the destination; and
    selecting one or more alternative routes to the destination based at least in part on the detected actual atmospheric conditions.

4. The method of claim 1, further comprising the steps of:
    detecting background noise along the selected route while the vehicle is en route to the destination; and
    selecting one or more alternative routes to the destination based at least in part on the detected background noise.

5. The method of claim 1, further comprising the steps of:
    detecting an actual acoustic signature of the vehicle while the vehicle is en route to the destination; and
    selecting one or more alternative routes to the destination based at least in part on the detected actual acoustic signature.

6. The method of claim 1, further comprising the steps of:
    generating acoustic data representing an acoustic profile of the vehicle; and
    presenting the acoustic profile to a user in real-time while the vehicle is en route to the destination.

7. A system for diminishing an effect of an acoustic signature of a vehicle while the vehicle is en route to a destination, comprising:

a first processor configured to retrieve acoustic data representing an acoustic model of the vehicle, terrain data representing terrain of a geographic area surrounding the destination, route data representing a plurality of routes to the destination, and weather data representing atmospheric conditions of the geographic area; and a second processor configured to select a route to the destination based on the acoustic data, the terrain data, the route data, and the weather data.

8. The system of claim 7, further comprising:

a route planning module configured to estimate the acoustic signature of the vehicle for each of the plurality of routes and to select a route including a smallest estimated acoustic signature as the selected route.

9. The system of claim 7, further comprising:

means for detecting actual atmospheric conditions of the geographic area while the vehicle is en route to the destination; and means for selecting one or more alternative routes to the destination based at least in part on the detected actual atmospheric conditions.

10. The system of claim 7, further comprising:

means for detecting background noise along the selected route while the vehicle is en route to the destination; and means for selecting one or more alternative routes to the destination based at least in part on the detected background noise.

11. The system of claim 7, further comprising:

means for detecting an actual acoustic signature of the vehicle while the vehicle is en route to the destination; and means for selecting one or more alternative routes to the destination based at least in part on the detected actual acoustic signature.

12. A system for diminishing an effects of an acoustic signature of a vehicle while the vehicle is en route to a destination, comprising:

memory storing:

acoustic data representing an acoustic model of the vehicle, terrain data representing a terrain model of a geographic area surrounding the destination, route data representing a model of a plurality of routes to the destination, and weather data representing atmospheric conditions of the geographic area; and a processor coupled to the memory and configured to select a route to the destination based on the acoustic data, the terrain data, the route data, and the weather data.

13. The system of claim 12, wherein the processor is further configured to:

estimate the acoustic signature of the vehicle for each of the plurality of routes; and select a route including a smallest estimated acoustic signature as the selected route.

14. The system of claim 12, further comprising a sensor coupled to the processor, the sensor configured to detect actual atmospheric conditions of the geographic area while the vehicle is en route to the destination, wherein the processor is further configured to select one or more alternative routes from a current location of the vehicle to the destination based at least in part on the detected actual atmospheric conditions.

15. The system of claim 12, further comprising a sensor coupled to the processor, the sensor configured to detect an actual acoustic signature of the vehicle while the vehicle is en route to the destination, wherein the processor is further configured to select one or more alternative routes from a current location of the vehicle to the destination based at least in part on the detected actual acoustic signature.

16. The system of claim 12, further comprising a sensor coupled to the processor, the sensor configured to detect background noise along the first route, wherein the processor is further configured to select one or more alternative routes from a current location of the vehicle to the destination based at least in part on the detected background noise.

17. The system of claim 12, further comprising a sensor coupled to the processor, the sensor configured to detect wind along the first route, wherein the processor is further configured to select one or more alternative routes from a current location of the vehicle to the destination based at least in part on the detected wind.

18. The system of claim 12, further comprising a global positioning system coupled to the processor, wherein the processor is further configured to track a current position of the vehicle along the selected route.

19. The system of claim 12, further comprising a display coupled to the processor, wherein the processor is configured to generate acoustic data representing an acoustic profile of the vehicle, and wherein the display is configured to present the acoustic profile to a user in real-time while the vehicle is en route to the destination.

* * * * *